United States Patent
Zad Issa et al.

(10) Patent No.: US 9,596,437 B2
(45) Date of Patent: Mar. 14, 2017

(54) AUDIO FOCUSING VIA MULTIPLE MICROPHONES

(71) Applicants: Syavosh Zad Issa, Kirkland, WA (US); Rod G. Fleck, Bellevue, WA (US)

(72) Inventors: Syavosh Zad Issa, Kirkland, WA (US); Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 558 days.

(21) Appl. No.: 13/972,781

(22) Filed: Aug. 21, 2013

(65) Prior Publication Data
US 2015/0054943 A1  Feb. 26, 2015

(51) Int. Cl.
| | |
|---|---|
| H04N 7/18 | (2006.01) |
| H04R 5/02 | (2006.01) |
| H04R 3/00 | (2006.01) |
| H04R 5/04 | (2006.01) |
| G06K 9/46 | (2006.01) |
| H04R 29/00 | (2006.01) |

(52) U.S. Cl.
CPC ............ *H04N 7/18* (2013.01); *H04R 3/005* (2013.01); *H04R 29/004* (2013.01); *H04R 2410/01* (2013.01); *H04R 2460/07* (2013.01); *H04R 2499/11* (2013.01); *H04R 2499/15* (2013.01)

(58) Field of Classification Search
CPC ... H04N 7/18; H04R 3/00; H04R 5/04; G06K 9/46
See application file for complete search history.

(56) References Cited

U.S. PATENT DOCUMENTS

| | | | | |
|---|---|---|---|---|
| 5,500,673 | A | * | 3/1996 | Zhou ............. G06K 9/00228 348/14.01 |
| 2007/0297682 | A1 | * | 12/2007 | Zhang ............ G06K 9/4614 382/224 |
| 2008/0232607 | A1 | | 9/2008 | Tashev et al. |
| 2008/0288219 | A1 | | 11/2008 | Tashev et al. |
| 2009/0043497 | A1 | | 2/2009 | Tashev et al. |
| 2011/0178798 | A1 | | 7/2011 | Flaks et al. |
| 2011/0238414 | A1 | | 9/2011 | Ju et al. |
| 2011/0274289 | A1 | | 11/2011 | Tashev et al. |
| 2011/0274291 | A1 | | 11/2011 | Tashev et al. |
| 2011/0307251 | A1 | | 12/2011 | Tashev et al. |
| 2012/0076304 | A1 | | 3/2012 | Suzuki |
| 2012/0128175 | A1 | | 5/2012 | Visser et al. |
| 2012/0148068 | A1 | | 6/2012 | Chandra et al. |

(Continued)

OTHER PUBLICATIONS

"International Search Report & Written Opinion for PCT Patent Application No. PCT/US2014/051565", Mailed Date: Nov. 18, 2014, 8 Pages.

(Continued)

*Primary Examiner* — Geepy Pe
*Assistant Examiner* — Patricia I Young
(74) *Attorney, Agent, or Firm* — Judy Yee; Micky Minhas

(57) ABSTRACT

Various technologies are applied to focus audio received from a plurality of microphones of a mobile device. A camera can be used to portray a scene, and a selection within the scene can focus audio to a desired audio focus region. Techniques can account for movement of the mobile device or an object being tracked. Pre-computed audio filters can be used to customize the audio focus process to account for a particular mobile device geometry.

17 Claims, 15 Drawing Sheets

(56) References Cited

U.S. PATENT DOCUMENTS

| | | | |
|---|---|---|---|
| 2012/0200772 A1* | 8/2012 | Minagawa | H04N 7/0352 348/500 |
| 2013/0057774 A1* | 3/2013 | Yoshida | H04M 1/72533 348/725 |
| 2014/0044279 A1 | 2/2014 | Kim et al. | |
| 2014/0056470 A1 | 2/2014 | Khawand et al. | |
| 2014/0119560 A1* | 5/2014 | Stewart | G10H 1/0083 381/77 |

OTHER PUBLICATIONS

Adve, "Switched and Sectored Beamforming," 2005, 13 pages.

"Beamforming," *Wikipedia*, visited Aug. 6, 2013, 4 pages.

"Beamforming Microphone Array," datasheet, *ClearOne*, Jul. 2013, 2 pages.

"Beamforming Microphone Array," installation guide, *ClearOne*, Jun. 2013, 28 pages.

Doclo et al., "Multi-microphone signal enhancement techniques for noisy speech signals," *TCTS-FPMS Seminar*, Dec. 21, 1999, 38 pages.

"Game-Changer Beamforming Microphone Array Takes Another Leap Ahead and Now Features Tabletop and Wall Mode Capabilities," *Doctor Decibel & Friends*, visited Aug. 6, 2013, 4 pages.

Herbordt et al., "Adaptive Beamforming for Audio Signal Acquisition," *Multimedia Communications and Signal Processing*, undated, 41 pages.

Huang et al., "Part I: Multichannel Speech Processing; 51. Time Delay Estimation and Source Localization," Benesty, Jacob, M. M. Sondhi and Yiteng (Eds.), *Springer Handbook of Speech Processing*, 2008, pp. 1043-1063.

"Microphone array," *Wikipedia*, visited Aug. 6, 2013, 2 pages.

Thomas, et al., "Beamformer Design Using Measured Microphone Directivity Patterns: Robustness to Modelling Error," *Microsoft Research*, undated, 4 pages.

Van Veen, et al., "Beamforming: A Versatile Approach to Spatial Filtering," *IEEE ASSP Magazine*, Apr. 1988, 21 pages.

Second Written Opinion of the International Preliminary Examining Authority, from corresponding PCT Application No. PCT/US2014/051565, dated Jul. 7, 2015, 6 pages.

International Preliminary Report on Patentability, from corresponding PCT Application No. PCT/US2014/051565, mailed Sep. 30, 2015, 7 pages.

* cited by examiner

AUDIO FOCUSING VIA MULTIPLE MICROPHONES

BACKGROUND

Contemporary mobile devices are equipped with microphones that are designed to pick up sounds. However, real-world sound environments commonly have multiple interfering sound sources, background noise, and the like. So, problems can arise when trying to listen to a particular sound source. There thus remains a need to focus audio to desired sources.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

The technologies include a method implemented at least in part by a computing system, the method comprising: displaying a scene currently viewed by a camera; receiving an indication of a location within the scene; translating the location in the scene into an audio focus region; and enhancing audio received by a plurality of microphones based on the audio focus region.

The technologies further include a mobile device comprising: a camera; a plurality of microphones; a display configured to display a scene viewed by the camera; an audio focus tool comprising a region translator configured to receive a location on the display and translate it into an audio focus region; a plurality of audio filters operable to accept input from the microphones and output enhanced audio as focused within the audio focus region; and an audio filter selector configured to choose the audio filters based on the audio focus region.

The technologies further include one or more computer-readable storage media having encoded thereon computer-executable instructions causing a computing system to perform a method comprising: receiving video output from a camera on a mobile device; displaying the video output from the camera on the mobile device on a display; receiving an indication of a location on the display; translating the location on the display into an audio focus region identifier, based at least on a combination of an azimuth range and an elevation range indicated by the location on the display; based on the audio focus region identifier, selecting a set of beamformer audio filters configured to enhance audio coming from an audio focus region associated with the audio focus region identifier; enhancing audio streams originating from respective of a plurality of microphones of the mobile device, wherein the enhancing comprises applying the beamformer audio filters to respective of the audio streams; and outputting the enhanced audio.

As described herein, a variety of other features and advantages can be incorporated into the technologies as desired.

DETAILED DESCRIPTION

Example 1

Exemplary Overview

The technologies described herein can be used for a variety of audio focus scenarios, and adoption of the technologies can provide improved techniques for focusing audio on a particular region in a scene shown on a mobile device. The user interfaces can better facilitate audio focusing. Other features described herein can be implemented to enhance functionality. Removal or avoidance of unwanted sounds can result.

Various other features can be implemented and combined as described herein.

Example 2

Exemplary System Implementing Audio Focusing

Figure 1:
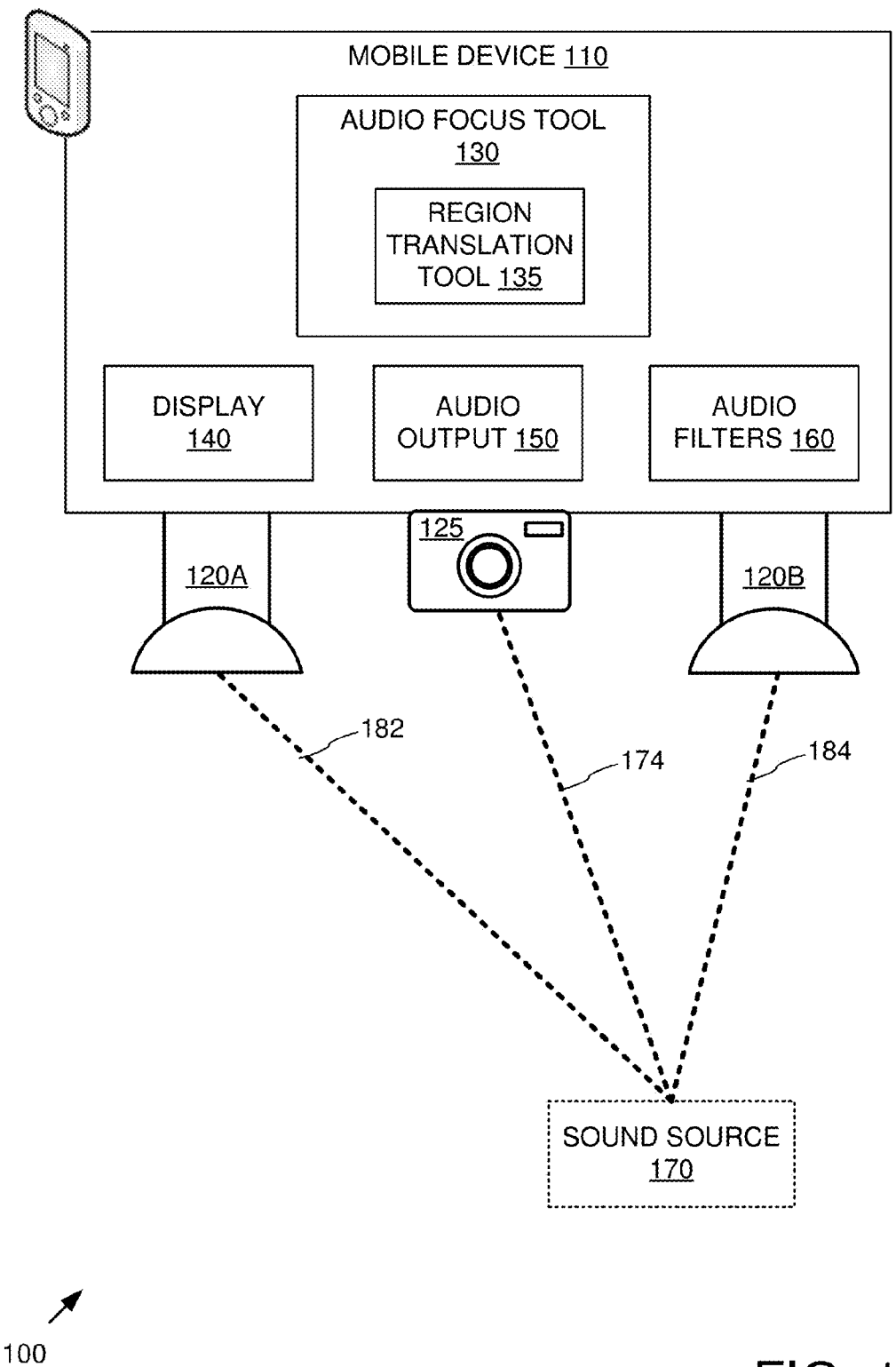
FIG. 1 is a block diagram of an exemplary system implementing audio focusing.

FIG. 1 is a block diagram of an exemplary system 100 implementing audio focusing as described herein.

For purposes of context, FIG. 1 shows that a mobile device 110 is located proximate a sound source 170. In practice, the sound source can be multiple sources and need not be explicitly recognized by the technologies.

In the example, the mobile device 110 includes a plurality of microphones 120A-B and a camera 125. The display 140 can be configured to display a scene presently viewed by the camera 125. An audio focus tool 130 can include a region translation tool 135, which can be configured to receive an indication of location (e.g., eventually represented as numerical coordinates) on the display 140 (e.g., while displaying the scene) and translate the indication of the location into an audio focus region. Such an audio focus region can be indicated by a direction 174 (e.g., one or more angles, ranges of angles, or the like) as described herein.

The audio filters 160 are configured to accept audio from the microphones 120A-B and output audio output 150 (e.g., as focused to sounds within the audio focus region). Due to the known geometry of the mobile device 110, the directions 182, 184 from the microphones to the sound source 170 can be known, inferred, or estimated based on the direction 174. The audio filters 160 can thus be configured to enhance audio coming from the direction of the sound source 170. As described herein, some implementations further include an audio filter selector configured to choose the audio filters based on the audio focus region.

Although various components are shown in separate boxes, in practice, component boundaries may vary. For example, the components can be provided as part of a phone operating system, application, camera software, or the like. Other arrangements are possible while still implementing the technologies.

In practice, the systems shown herein, such as system 100 can be more complicated, with additional functionality, more communication microphones, and the like.

Various other components, such as analog-to-digital converters and the like are not shown but are typically included to couple the components.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, audio filters, tables, and applications can be stored in one or more computer-readable storage media or computer-readable storage devices. The technologies described herein can be generic to the specifics of operating systems or hardware and can be applied in any variety of environments to take advantage of the described features.

Example 3

Exemplary Method Implementing Audio Focusing

Figure 2:
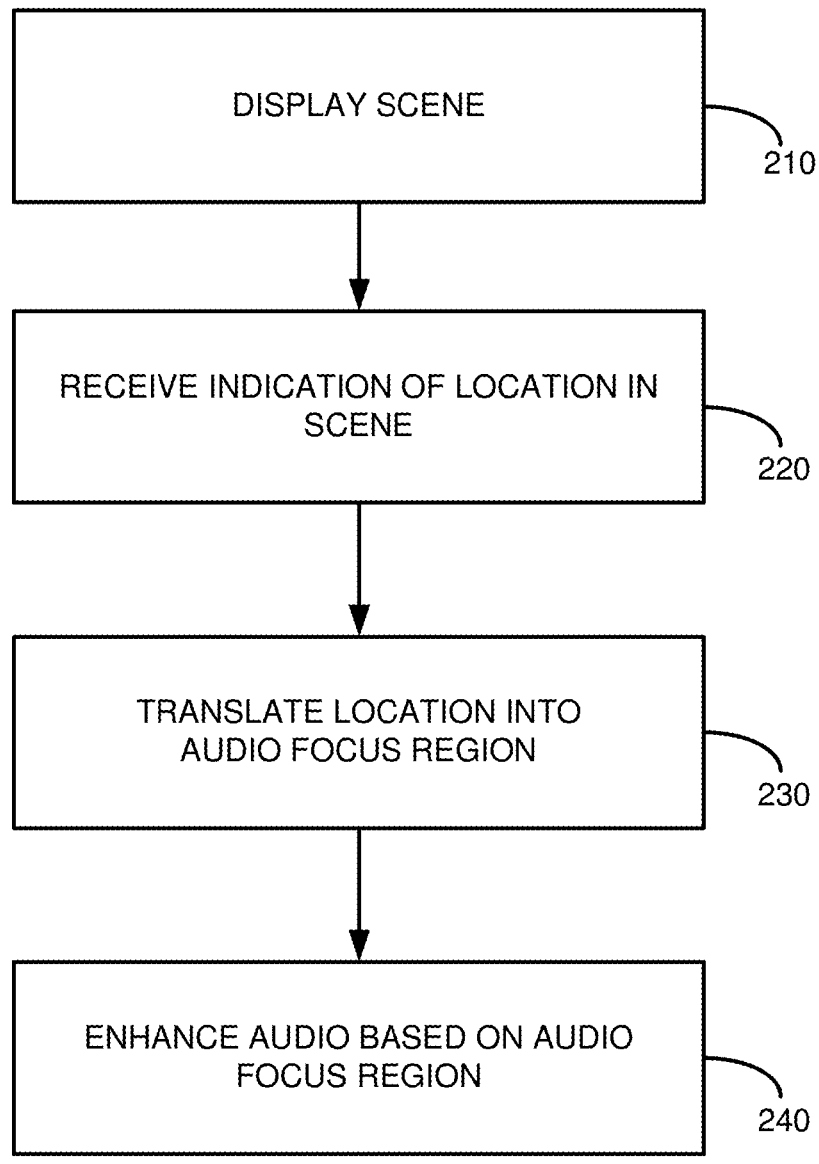
FIG. 2 is a flowchart of an exemplary method of implementing audio focusing.

FIG. 2 is a flowchart of an exemplary method 200 of implementing audio focusing and can be implemented, for example, in the system shown in FIG. 1.

The method 200 is typically performed when the device is within hearing distance of a sound source, and it is desired to enhance (e.g., emphasize) sound originating from the sound source. A camera of a mobile device can be aimed at the sound source, and video output from the camera is received, which is then displayed on the display.

At 210, a scene viewed by a camera is displayed on a display. As described herein, the scene can depict at least one sound source within hearing distance of a plurality of microphones associated with the mobile device.

At 220, an indication of a location in the scene is received. For example, an indication of location on the display can be received. Such a location can take the form of an x,y coordinates of the display, a three-dimensional location (x,y,z) in space with respect to the display or device, or the like. Thus, an area or point of interest (e.g., corresponding to a desired sound source or within a desired sound source) can be indicated.

At 230, the location is translated into an audio focus region as described herein.

At 240, audio from the plurality of microphones is enhanced based on the audio focus region. As described herein, enhancement can comprise application of audio filters. Application of the audio filters can emphasize sound originating from the audio focus region, while suppressing sounds from other directions. Alternatively, the filters can dampen sound originating from the audio focus region.

The audio can then be output (e.g., audibly, as a signal for recording, or both) for any of a variety of purposes. For example, output can be to a speaker, earpiece, headphone, or the like.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Exemplary Scenes and Sound Stages

In any of the examples herein, a display of a mobile device can portray a camera's current view as a scene. In practice, the entire view of the camera need not be displayed. For example, the camera's view can be cropped, zoomed, or otherwise modified.

The scene can depict a corresponding sound stage (e.g., physical area from which audio originates) from which sounds are received by a plurality of microphones of the mobile device. As described herein, the display can depict at least one sound source within hearing distance of the plurality of microphones. Locations within the scene can be mapped to audio focus regions within the sound stage as described herein.

Example 5

Exemplary Location in Scene

In any of the examples herein, an indication of a location in a scene can be received. Two-dimensional and three-dimensional locations can be supported. In practice, a user can indicate a location by interacting with the displayed scene in a variety of ways, such as by a gesture (e.g., tapping a location on the display, flicking, circling, or the like) on a display (e.g., touchscreen or other display device or area). Other systems can support hovering over or within a location on the display, clicking, voice activation, blinking, winking, or the like.

Although a point within the scene can be received, other implementations can support receiving a two dimensional area such as a circle, square, or arbitrary shape. If the shape spans multiple audio focus regions, outputs from filters from multiple regions can be combined when subsequently providing audio output.

A selected location in the display can be translated into a numerical representation of the location (e.g., x,y coordinates, a closed shape, or the like). As described herein, given the device geometry, the numerical representation of the location can then be translated into an audio focus region within the sound stage.

Example 6

Exemplary Audio Focus Region

In any of the examples herein, the sound stage from which the plurality of microphones receive audio can be divided into a plurality of audio focus regions. Such regions can take a variety of forms or shapes and typically indicate a region of interest. As described herein, the audio focus regions can be correlated with locations in a scene.

The audio focus region can be defined via azimuth and elevation angles in three-dimensional space, where the device is the center.

An implementation can divide the sound stage into audio focus regions based on azimuth ranges and elevation ranges as described herein. A particular combination (e.g., a combination out of a plurality of possible combination permutations) of a given azimuth range and a given elevation range can then be translated into an audio focus region as described herein. An audio focus region can be identified by an audio focus region identifier; a combination of azimuth range identifier and elevation range identifier; or the like.

Example 7

Exemplary Translation into Audio Focus Region

In any of the examples herein, a location within a scene can be translated into an audio focus region. For example, a mathematical transform can be employed to translate from a coordinate system associated with a display to an audio focus region. Although intermediary translations may be used or implied, in practice, such intermediary translations can be made transparent.

Example 8

Exemplary Device Geometry

In any of the examples herein, a device's geometry can affect how the various technologies are implemented. For example, based on the number of microphones and their placement and orientation on the mobile device, the audio filters can take different forms.

Similarly, the placement and orientation of the camera with respect to the microphones can affect translation of the location within a scene to an audio focus region, the audio filters, or both.

The device's geometry need not be explicitly stored or represented in the device. For example, filters can be pre-computed based on the device geometry and provided for use with the device. Such filters can take into account microphone placement and orientation on the mobile device (e.g., with respect to the camera placement and orientation).

An exemplary implementation employs four or five microphones. Microphone placement and orientation can be determined to better focus certain frequencies (e.g., the human voice range or the like).

Example 9

Exemplary Audio Filters

In any of the examples herein, a variety of audio filters can be applied to achieve enhancement of audio as described. In practice, after an audio focus region has been determined, a set of audio filters associated with the audio focus region (e.g., one per microphone) is applied to respective of the microphones (e.g., for a set of n audio filters associated with the audio focus region, an audio filter from the set is applied to each of the n microphones). A stream of digital audio data from a microphone can thus be filtered according to the audio filter. The output of the filters can then be combined to provide a digital stream of audio in which audio from the audio focus region is emphasized.

Spatial filtering technologies can be applied to filter out audio originating from a direction corresponding to the audio focus region. Thus, sound from the audio focus region can be isolated.

A particular technique of spatial processing or spatial filtering is called "beamforming." Beamforming can involve applying filters to the audio signal coming from each microphone and can thus focus audio as described herein. A tool or process that applies beamforming is sometimes called a "beamformer" herein. Beamformers can be applied in a wide variety of device types and use case scenarios. Although adaptive beamforming may be used, switched fixed beamforming is shown in the examples that use pre-computed filters. Other spatial processing techniques, such as blind source separation, computational auditory scene analysis, and non-negative matrix factorization can also be applied.

A variety of beamforming (e.g., spatial filtering) techniques can be applied and can differ depending on how the filters are designed. For example, data independent (e.g., fixed) beamformers can be further divided on what criteria is used to design the filters (e.g., what is being optimized for, such as instance directivity, noise rejection). Data dependent (e.g., adaptive) beamformers can be further divided based on criteria to design as well as how the coefficients of the filter are adapted (e.g., based on what the criteria). Any of such beamformers can be supported herein.

Example 10

Exemplary Audio Focusing System Accounting for Device Movement

Figure 3:
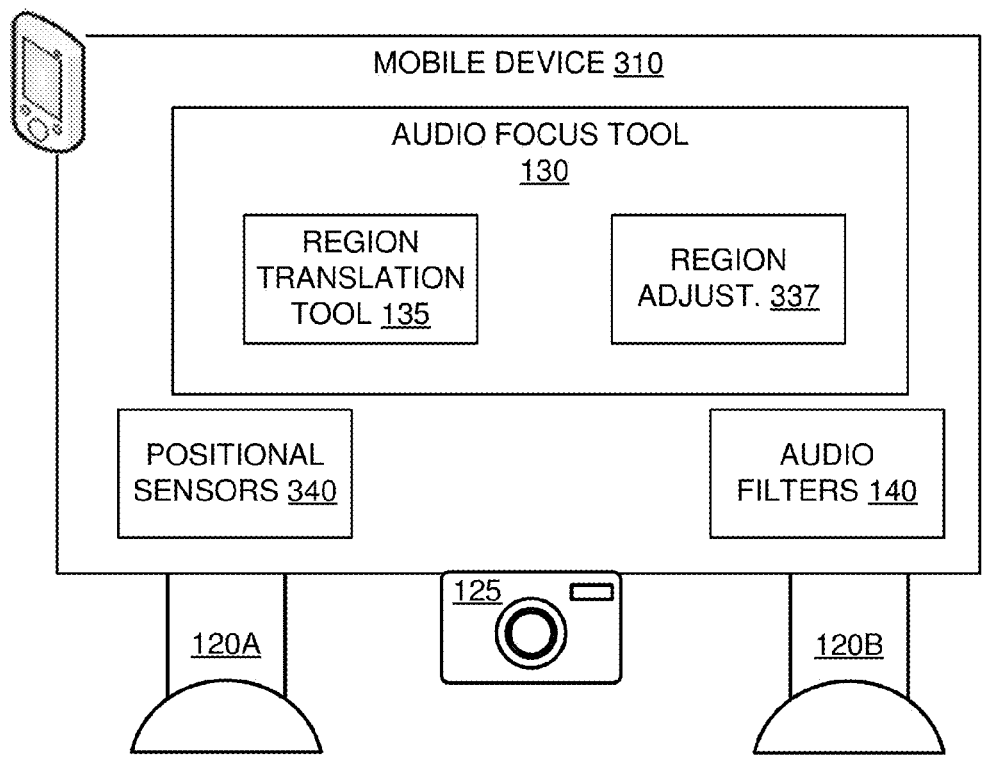
FIG. 3 is a block diagram of an exemplary system configured to implement audio focusing while accounting for movement of a device.

FIG. 3 is a block diagram showing an exemplary system 300 configured to implement audio focusing while accounting for movement of a device. In the example, a mobile device 310 (e.g., mobile device 110 of FIG. 1) further comprises positional sensors 340 and an audio focus region adjustment tool 337.

Positional sensors 340 can determine changes in position of the mobile device 310 and can take the form of a compass, gyroscope, accelerometer, magnetometer, the like, or combinations thereof.

The audio focus region adjustment tool 337 can be coupled to the positional sensors 340 and adjust the current audio focus region according to the changes in positions detected thereby.

Example 11

Figure 4:
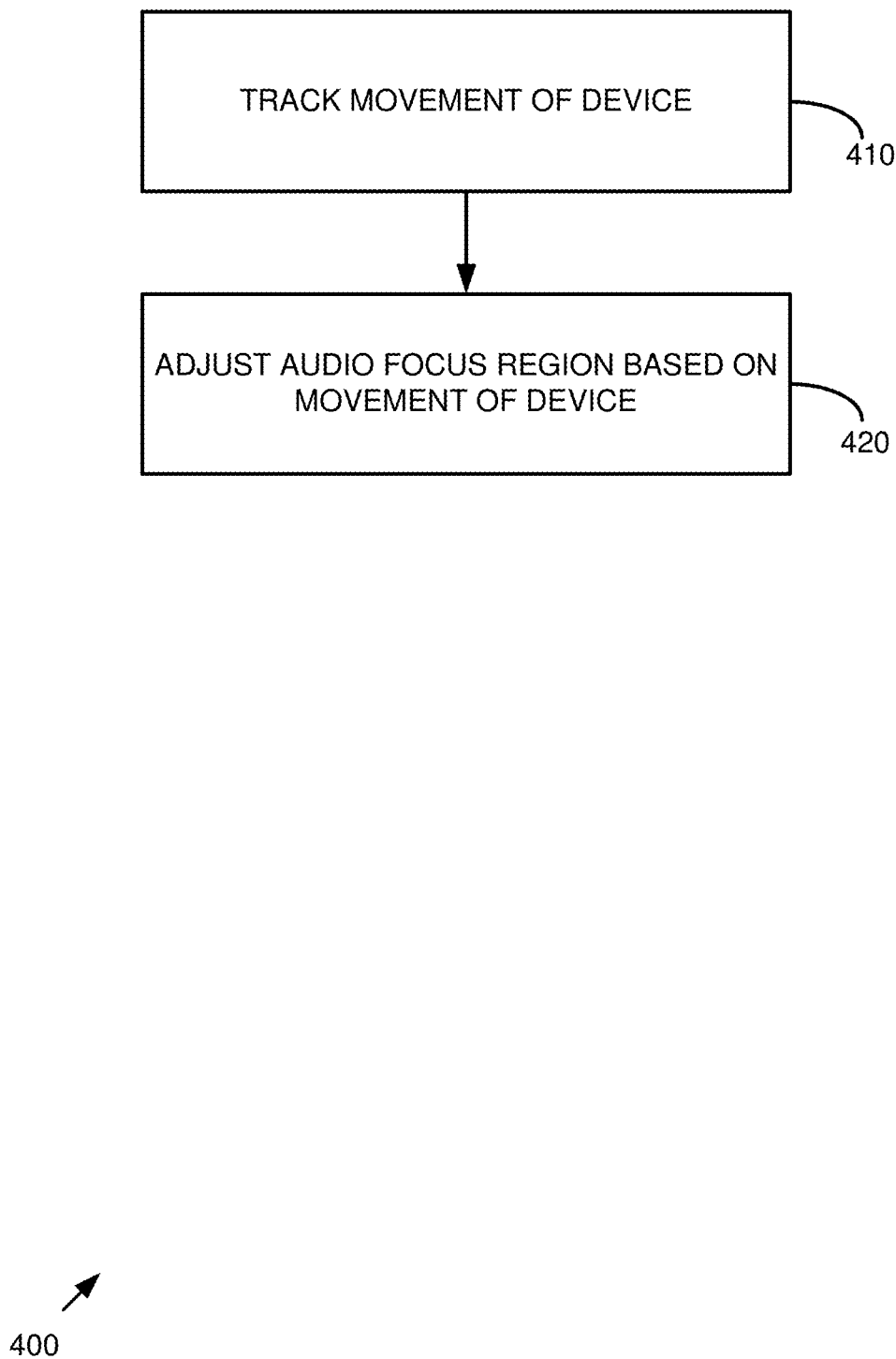
FIG. 4 is a flowchart of an exemplary method of implementing audio focusing while accounting for movement of a device.

Exemplary Method Implementing Audio Focusing Accounting for Movement of a Device FIG. 4 is a flowchart of an exemplary method 400 of implementing audio focusing while accounting for movement of a device and can be implemented, for example, in the system shown in FIG. 3.

At 410, the movement of the mobile device is tracked via one or more positional sensors. For example, an original position in three-dimensional space can be stored, and changes in position (e.g., including orientation) can be determined. Position can be stored in various coordinate forms, such as Cartesian (e.g., x,y,z), polar, or the like.

At 420, the audio focus region is adjusted based on the movement of the device. For example, a different audio focus region can be selected if movement of the device so indicates.

Example 12

Exemplary Audio Focusing System Accounting for Object Movement

Figure 5:
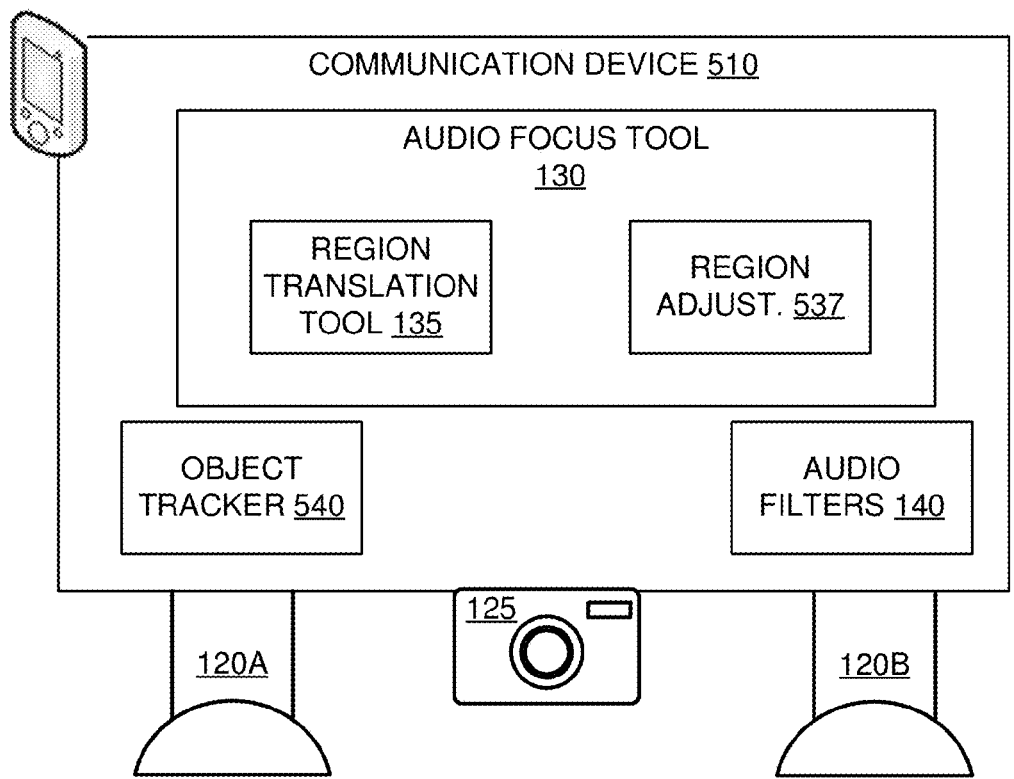
FIG. 5 is a block diagram of an exemplary system configured to implement audio focusing while accounting for movement of an object.
Figure 5:

FIG. 5 is a block diagram showing an exemplary system 500 configured to implement audio focusing while accounting for movement of an object. In the example, a communication device 510 (e.g., communication device 110 of FIG. 1) further comprises an object tracker 540 and an audio focus region adjustment tool 537.

The object tracker 540 can track changes in position of an object (e.g., in an audio focus region) and can take the form of a tool employing audio localization techniques, face recognition technologies, or the like.

The audio focus region adjustment tool 537 can be coupled to the object tracker 540 and configured to adjust the current audio focus region according to the changes in positions detected thereby.

An implementation can employ both the described object tracker 540 and the positional sensors of FIG. 3.

Example 13

Figure 6:
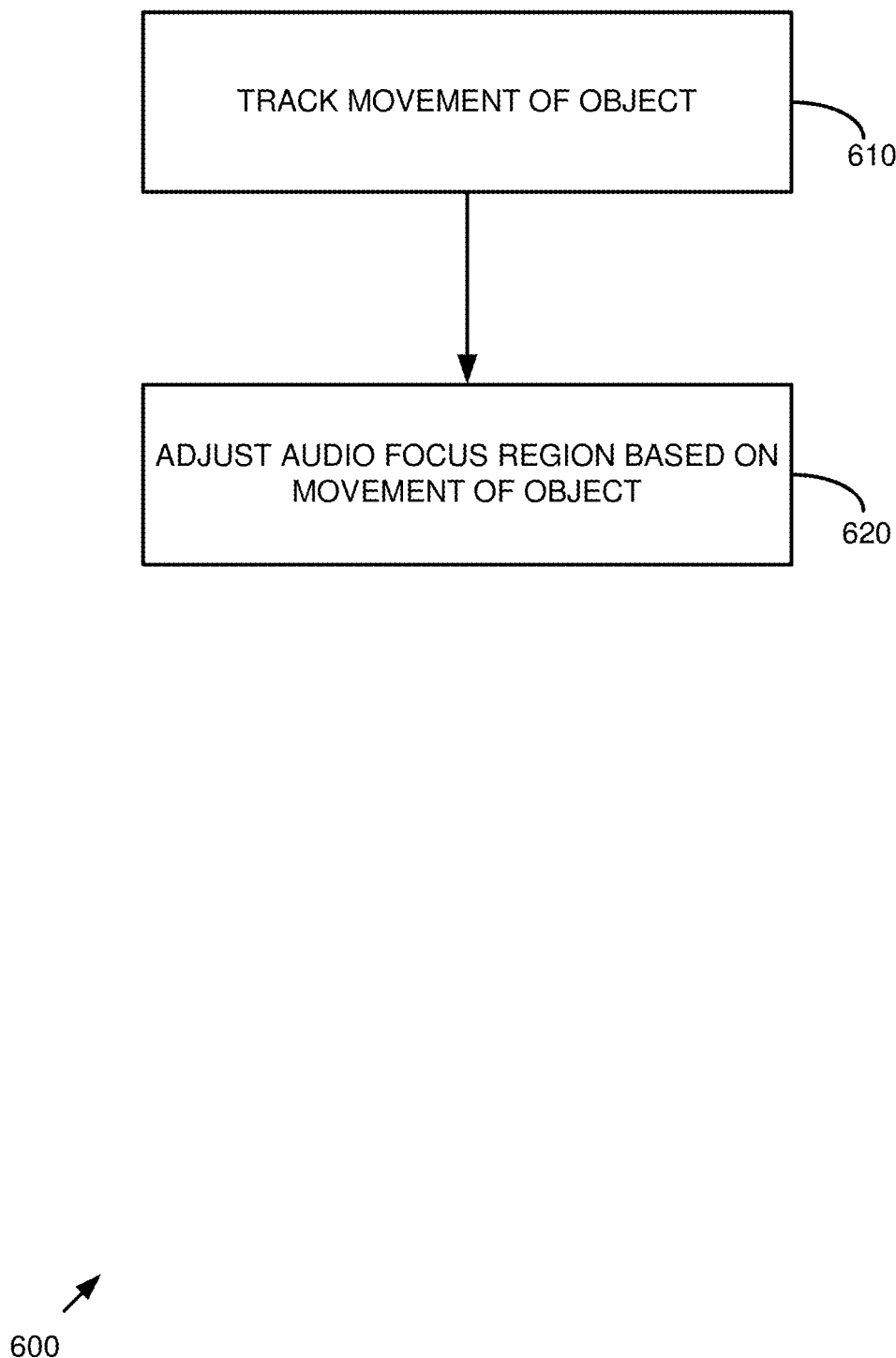
FIG. 6 is a flowchart of an exemplary method of implementing audio focusing while accounting for movement of an object.

Exemplary Method Implementing Audio Focusing Accounting for Movement of an Object FIG. 6 is a flowchart of an exemplary method 600 of implementing audio focusing while accounting for movement of an object and can be implemented, for example, in the system shown in FIG. 5.

At 610, the movement of an object (e.g., in a scene) is tracked. For example, an original position can be stored, and changes in position can be determined. Position can be stored in various coordinate forms, such as Cartesian (e.g., x,y,z), polar, or the like. Face detection technologies can be used to determine movement of an object.

At 620, the audio focus region is adjusted based on the movement of the object. For example, if it is detected that the object has moved to a different audio focus region, the current audio focus region used for enhancing audio can be updated.

The method of FIG. 6 can be incorporated with the method of FIG. 4 so that both device movement and object movement can be accounted for in a single device.

Example 14

Exemplary Audio Focus Regions by Azimuth

Figure 7:
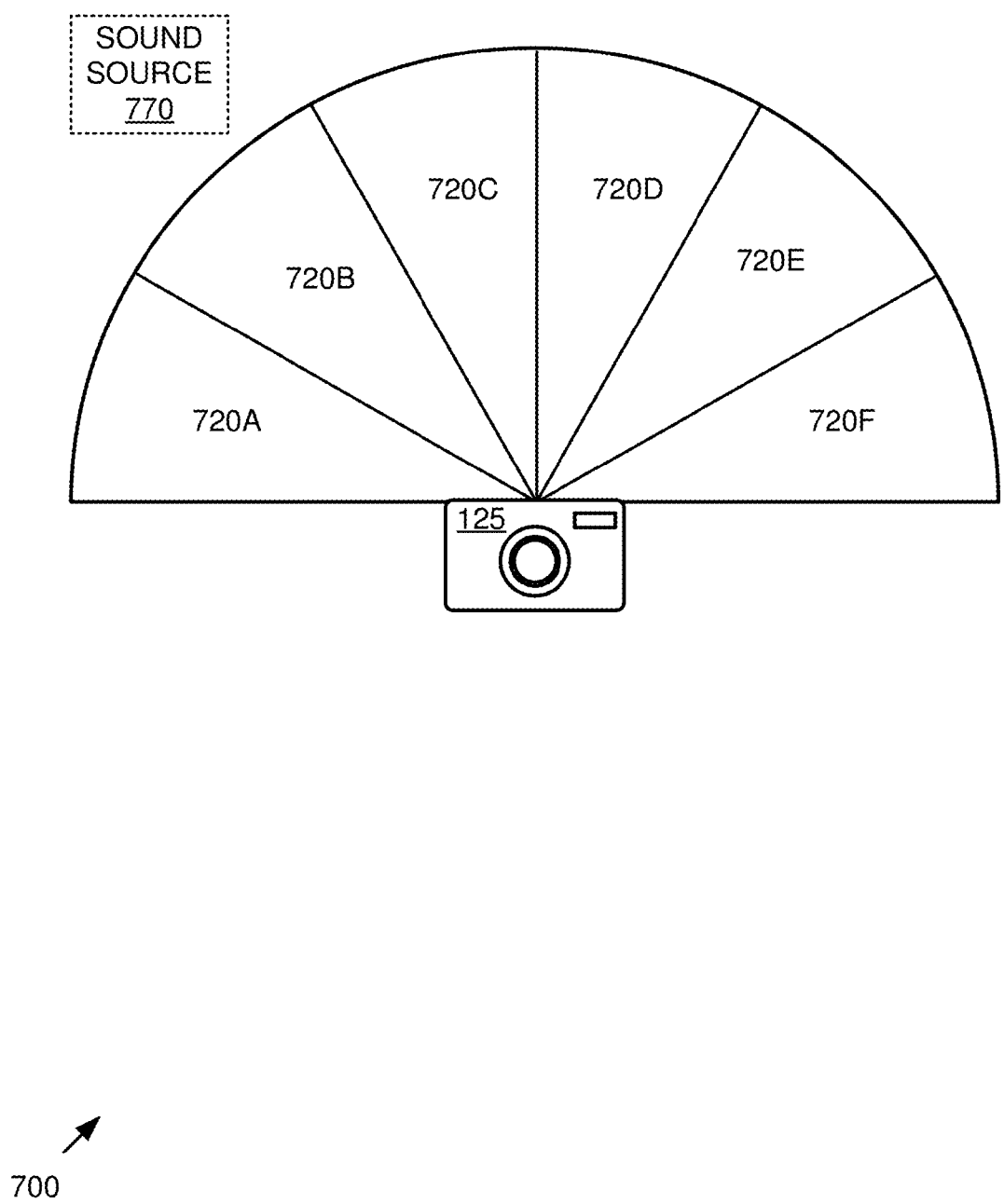
FIG. 7 is a block diagram of a scene divided into audio focus regions by azimuth.

FIG. 7 is a block diagram 700 of a sound stage (e.g., corresponding to a scene) divided into audio focus regions by azimuth. In the example, the half-plane in front of the device (e.g., what the user sees in front when pointing the camera in a given direction) as viewed by the camera 125 is partitioned into a (e.g., a plurality of) ranges 720A-F by azimuth. In the example, a=6; however, the number of ranges can be adjusted as desired. The ranges can be assumed to extend out to a given distance (e.g., the range of hearing of the microphones). So, a sound source 770 can be considered to be within one of the azimuth ranges 720B (e.g., within the azimuth range of 30-60 degrees).

In practice, the sound stage can be further divided by elevation. For example, e (e.g., a plurality of) ranges can be denoted. As an example, such an arrangement could have e/2 ranges above zero elevation and e/2 ranges below zero elevation. Other arrangements are possible (e.g., zero elevation is the lowest elevation depicted in the scene or the like). As described above, e can be 6; however, the number of ranges can be adjusted as desired.

For example, if 180 degrees for azimuth is divided into a ranges, and 180 degrees for elevation is divided into e ranges, there will be a×e total audio focus regions. In practice, fewer than 180 degrees may be represented due to the limited field available to typical cameras.

By permuting the azimuth and elevation ranges, a×e audio focus regions can be defined. As described herein, audio filters can then be chosen based on the particular audio focus region. Regions can also be adjusted based on device movement and object movement as described herein.

Example 15

Exemplary Pre-Computed Audio Filters for Regions

Figure 8:
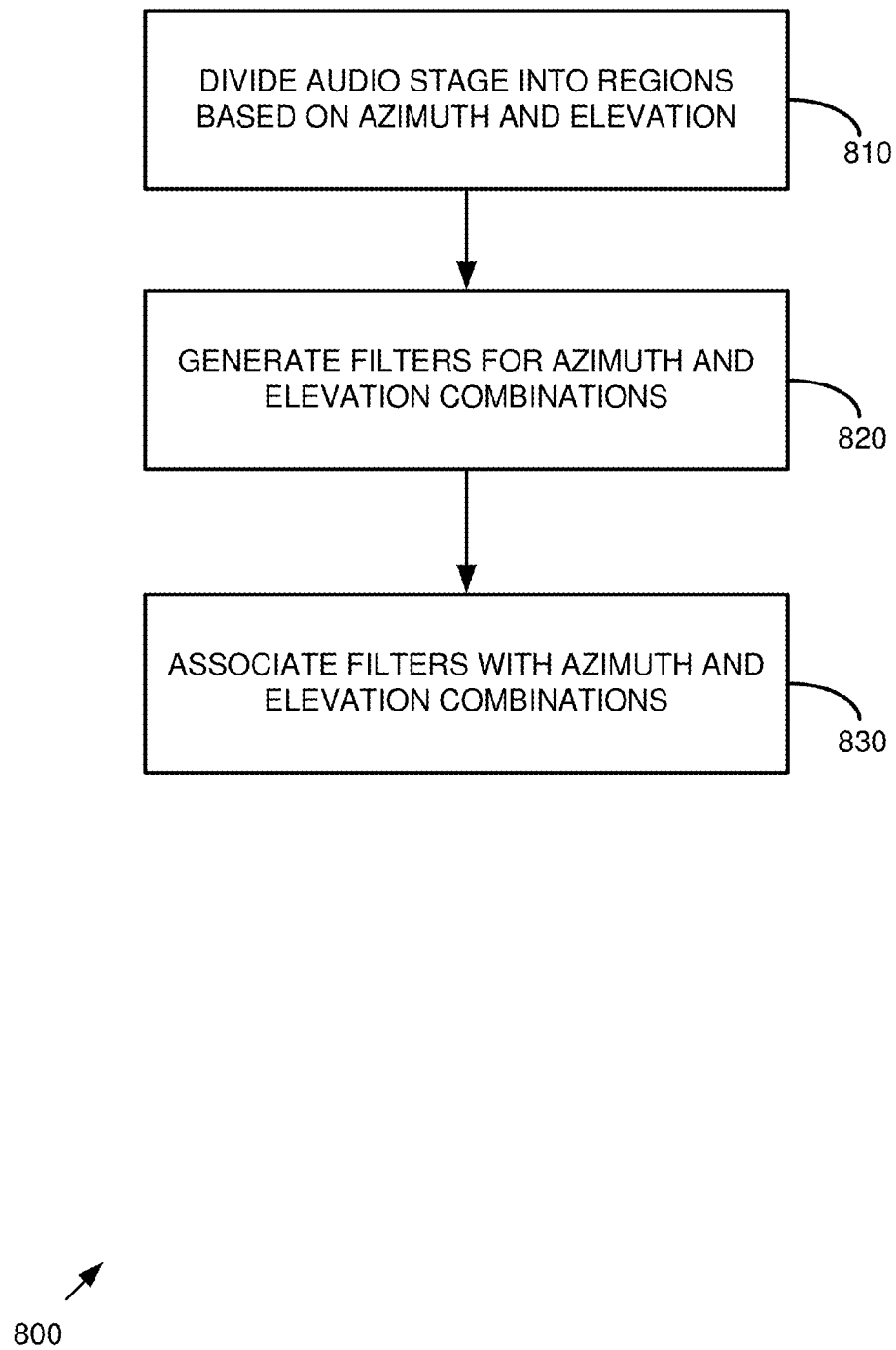
FIG. 8 is a flowchart of an exemplary method of developing region-specific filters.

FIG. 8 is a flowchart of an exemplary method 800 of developing region-specific filters and can be implemented, for example, using the arrangement shown in FIG. 7. In practice, the method 800 can be performed prior to use of the other methods shown herein.

Before the method 800 commences, the device geometry for a particular mobile device can be determined, and the filters generated according to the given mobile device geometry.

At 810, the sound stage can be divided into audio focus regions based on azimuth and elevation ranges as described herein.

At 820, sets of respective audio filters (e.g., a filter per microphone in the set) can be generated for each of the audio focus regions (e.g., each of the azimuth and elevation range combinations). Thus, in an implementation with m microphones, a total of a×e×m filters can be generated. In practice, some filters may be superfluous or impractical and need not be included.

At 830, the filters are associated with the audio focus regions (e.g., azimuth and elevation combinations). Thus, a set of filters (e.g., a filter per microphone) can be associated with a given combination.

If desired, the audio filters can then be provided to the mobile device. For example, they can be integrated into the device in hardware (e.g., ASIC, ROM, or the like) or software form. Or, the filters can be acquired as part of an application or an update to such an application. A table can be employed as described herein by which lookup of appropriate filters can be accomplished.

Subsequently, when a request to enhance audio in the audio focus region associated with a particular combination is received, the filters associated with the particular combination can be applied to audio from the microphones.

Filter sets can be associated with particular devices so that different filters are provided for different devices (e.g., when device geometry so dictates).

Example 16

Exemplary Method of Audio Focusing Via Pre-Computed Region-Specific Filters

Figure 9:
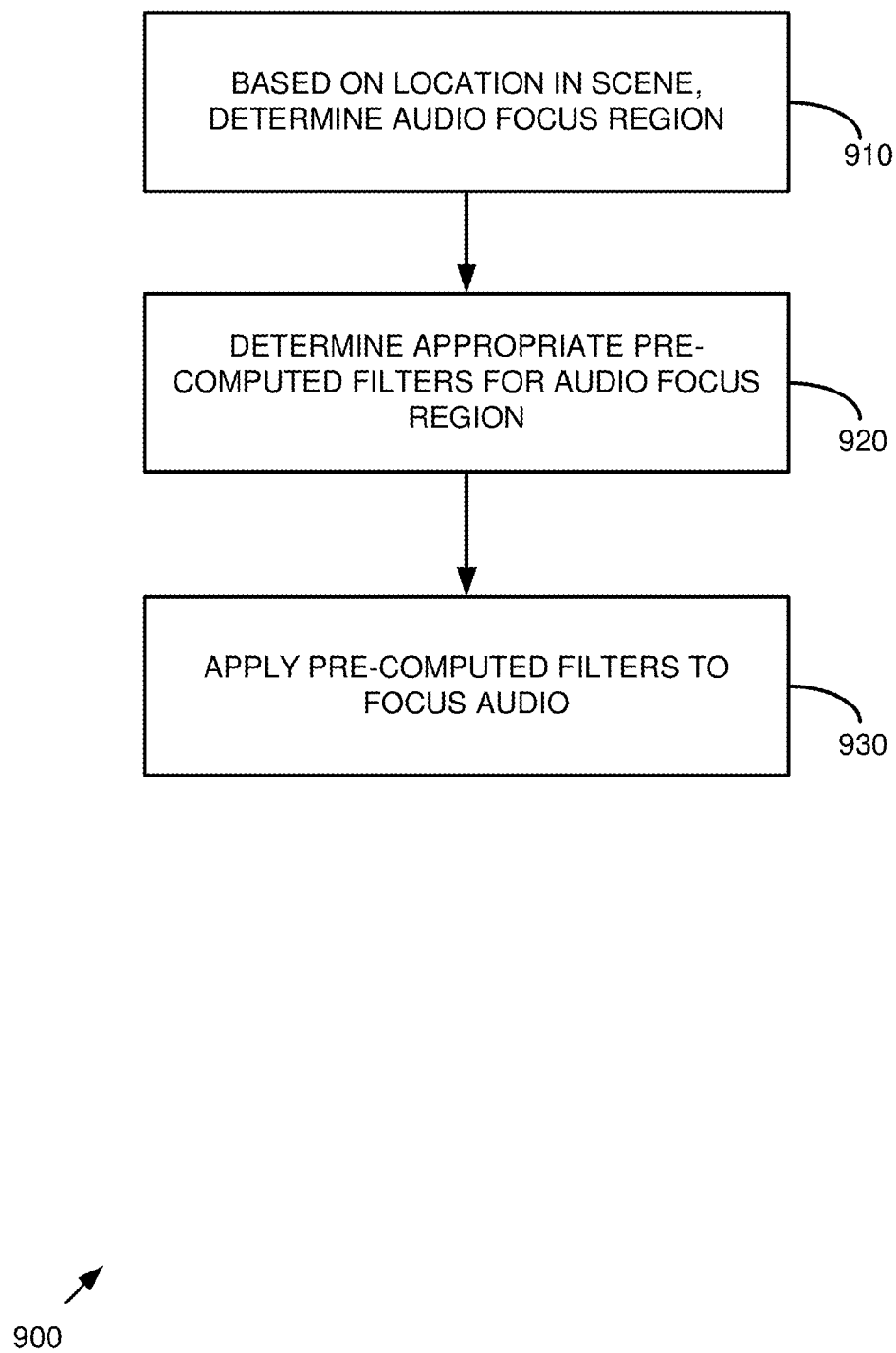
FIG. 9 is a flowchart of an exemplary method of implementing audio focusing via pre-computed region-specific filters.

FIG. 9 is a flowchart of an exemplary method 900 of implementing audio focusing via pre-computed region-specific filters and can be implemented, for example, using the arrangement shown in FIG. 1 and integrated into the method of FIG. 2. The method can be performed at the time audio is emanating from within an audio focus region to enhance audio as described herein. The audio filters can be pre-computed as described herein (e.g., based on combinations of azimuth ranges and elevation ranges based on microphone placement on the mobile device). Selection logic for choosing a filter set can also be included. The audio filters can be stored as described herein.

At 910, based on the location in the scene, an audio focus region is determined. As described herein, an azimuth range and elevation range combination can be determined. For example, an azimuth and elevation corresponding to a location on the display can be determined. It can then be determined into which azimuth range the azimuth falls and into which elevation range the elevation falls. The azimuth ranges can be identified by azimuth range identifiers, and the elevation ranges can be identified by elevation range identifiers.

At 920, appropriate pre-computed audio filters for the audio focus region (e.g., azimuth range and elevation range combination) are determined (e.g., selected). For example, given a particular combination, a set of audio filters can be identified. The azimuth and elevation can thus be translated into an audio focus region identifier. Alternatively, an azimuth range identifier combination and an elevation range identifier combination can be determined and the pre-computed audio filters can be selected by mapping the azimuth range identifier and the elevation range identifier combination to the audio filters.

At 930, the pre-computed filters can be applied (e.g., to audio received from respective of the microphones) to focus audio. Thus, enhancement of audio in the direction indicated by the azimuth and elevation can be accomplished.

Example 17

Exemplary Audio Filter Table

Figure 10:
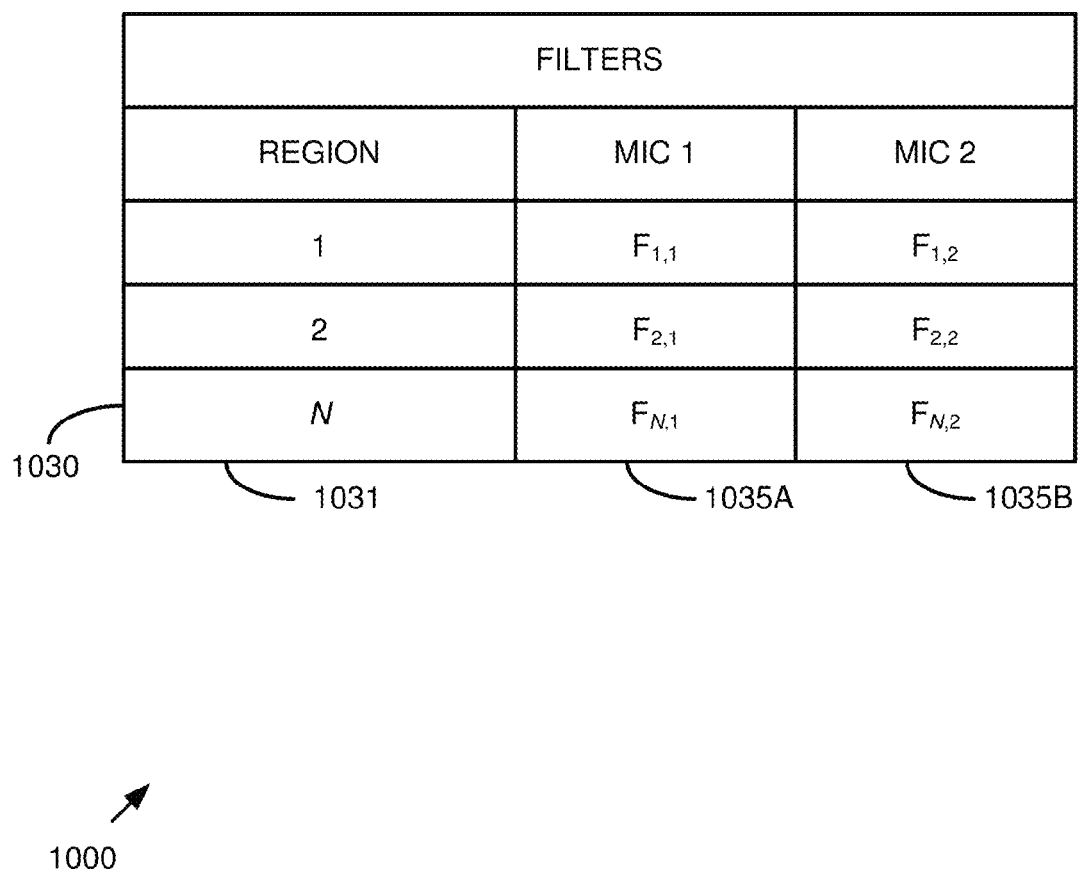
FIG. 10 is a diagram of an exemplary table for pre-computed region-specific filters.

FIG. 10 is a diagram of an exemplary table 1000 for looking up pre-computed region-specific filters. In the example, audio focus regions 1031 are associated with a filter set 1035A, 1035B in entries 1030 of the table 1000.

In practice, there may be more filters for more microphones. For example, if there are m microphones used to focus audio, there can be m filters associated with each audio focus region (e.g., one filter per microphone for a given audio focus region).

The audio focus region 1031 can be represented by an audio focus region identifier. In some implementations, a combination or permutation (e.g., 2 identifiers) can be used (e.g., one for azimuth range and one for elevation range).

Thus, in any of the examples herein, selecting pre-computed audio filters can comprise identifying an entry in a table of pre-computed audio filters.

Example 18

Exemplary Per-Microphone Audio Filter Arrangement

Figure 11:
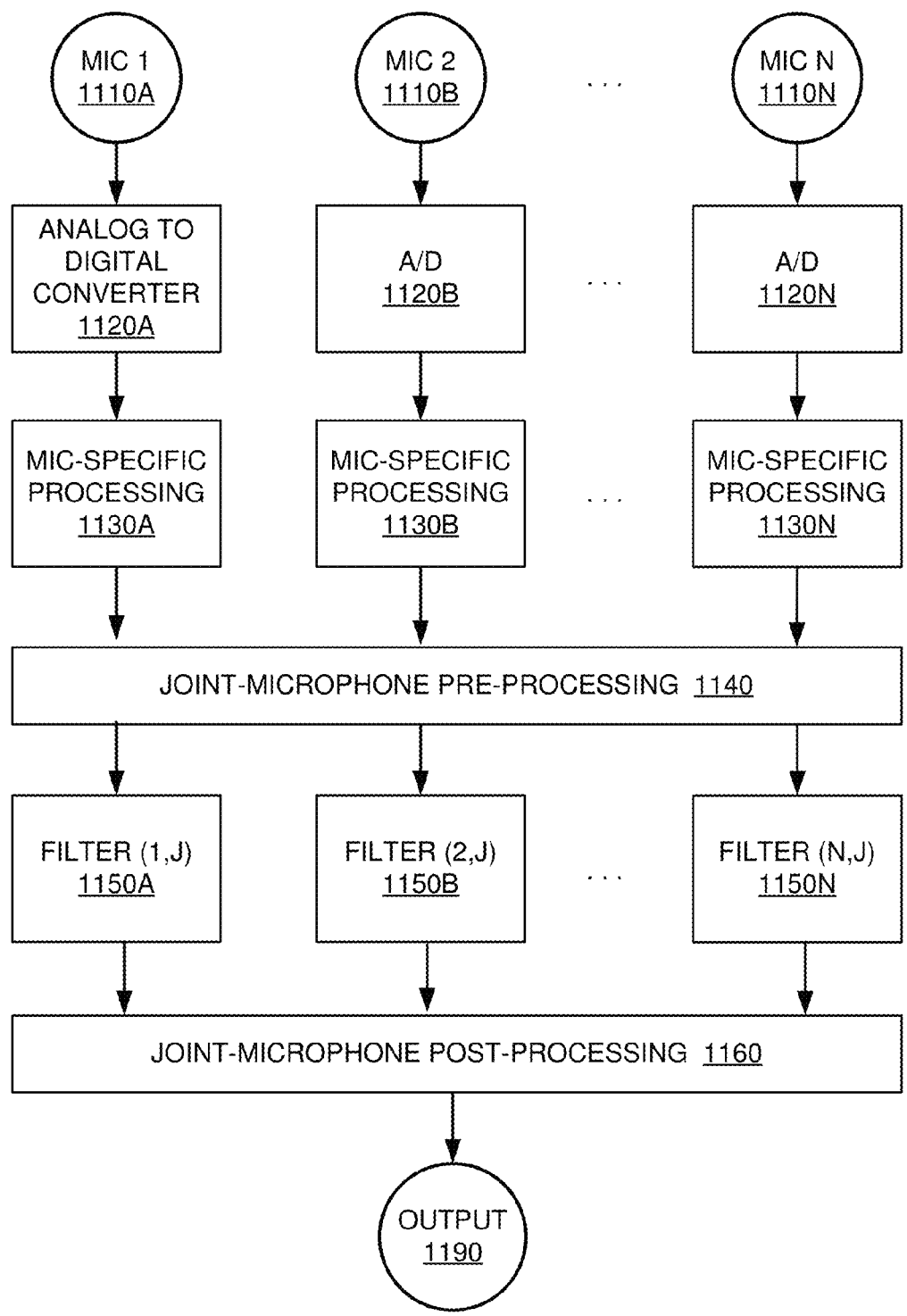
FIG. 11 is a block diagram of a system for implementing audio focusing via a plurality of per-microphone audio filters.

FIG. 11 is a block diagram of a system 1100 for implementing audio focusing via a plurality of per-microphone audio filters 1150A-N. In the example, N microphones 1110A-N are supported, and K audio focus regions are supported.

In the example, a microphone 1110A sends analog output to an analog-to-digital converter 1120A. Similarly, a second microphone 1110B sends analog output to an analog-to-digital converter 1120B. The microphone 1110N can also output to converter 1120N.

The digital output can be processed by microphone-specific processing 1130A-N (e.g., per microphone). Examples of such processing include gain, frequency, phase adjustment, failure detection, and the like.

At 1140, any joint-microphone pre-processing can be performed. Examples include any form of equalization, signal conditioning, stationary noise suppression, reverberation cancellation, or the like.

Subsequently, the output of the joint-microphone pre-processing 1140 can be processed by selected per-microphone audio filters 1150A-N (e.g., the filters implementing beamforming described herein). As shown, J=1 to K, where K is the number of audio focus regions. The filters can thus be selected based on the determined audio focus region, and a different filter applied per microphone.

The outputs of the filters 1150A-N can then be subjected to joint-microphone post-processing 1160. Examples include non-linear processing, such as transition enhancement (e.g., when switching from one audio focus region to another), gain ramp up, gain ramp down, reverberation suppression, or the like. Any form of signal processing that improves or enhances the output after application of the beamformer can be used. Such processing can be applied independently of the audio focus process to generate the output 1190.

Example 19

Exemplary User Interface for Receiving Indication of Location

Figure 12:
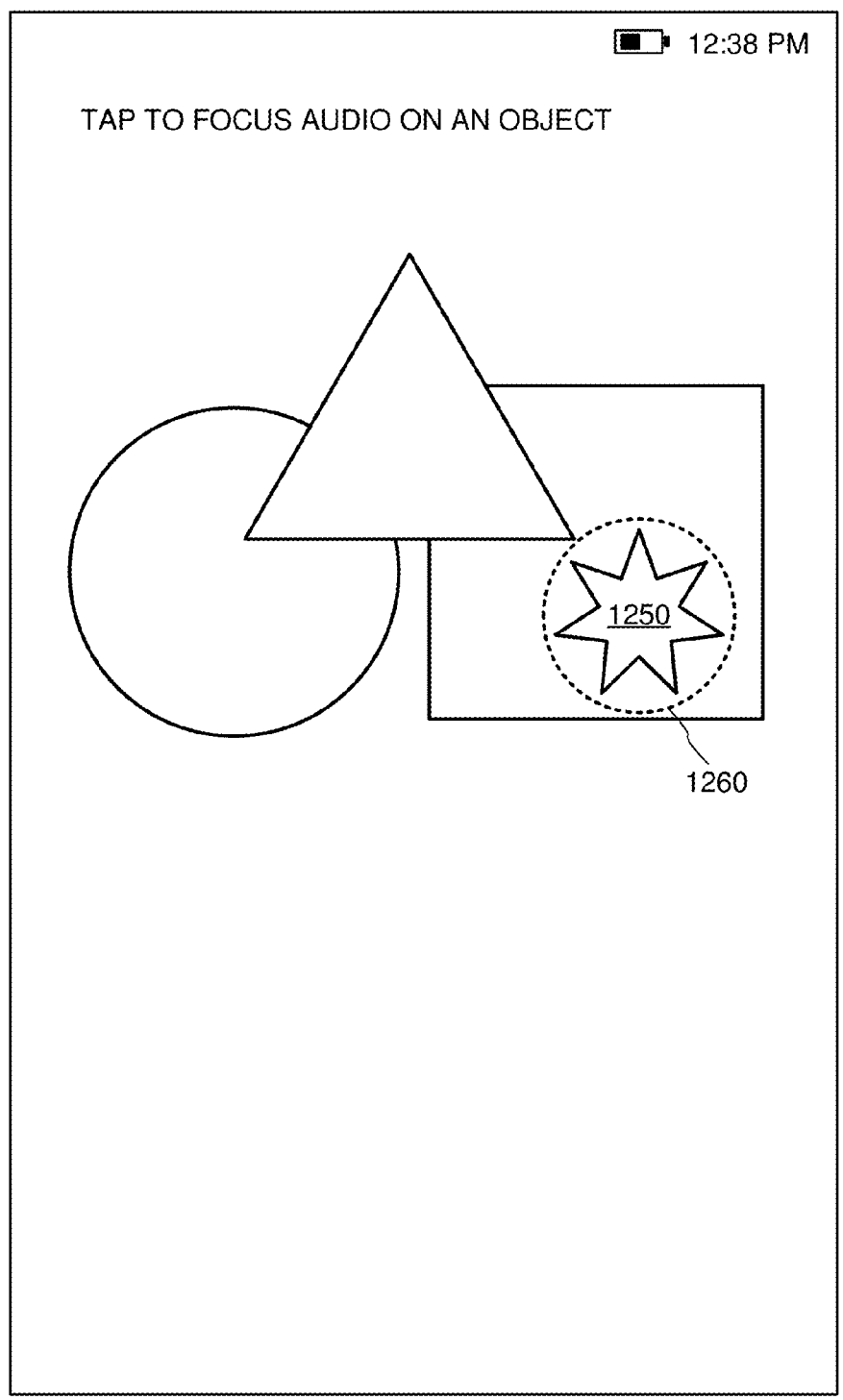
FIG. 12 is a wire frame of an exemplary user interface for receiving an indication of a location in a scene.

FIG. 12 is a wire frame of an exemplary user interface 1200 for receiving an indication of a location in a scene corresponding to a sound stage. In the example, the display is displaying a view from a camera of a mobile device. A user can navigate to the user interface by starting camera functionality and pointing the camera in the direction of interest.

The scene includes depiction of an object 1250 within hearing distance of the microphones of the device.

A user can indicate a location 1260 on the display. To confirm that the indication was not inadvertent, a menu or other user interfaced element can be displayed to confirm the audio enhancing feature.

The location can then be translated into an audio focus region as described herein.

Once a location has been selected, an indication can be shown in the user interface (e.g., a circle) so that a user can see or confirm where selection has taken place. Subsequently, the location can be moved around, deleted, or the like. Multiple locations can be supported as described herein.

Example 20

Exemplary Null Implementation

In any of the examples herein, filters can be developed and used to dampen (e.g., attenuate, suppress, or the like) sound originating from the audio focus region. In such a case, an indication of a location in a scene indicates a location from which sound is to be filtered out (e.g., a null is applied in the direction indicated) or an area of rejection.

Example 21

Exemplary Pluggable Filters

The audio filters described can be decoupled from the audio focusing software to accommodate easy replacement of the audio filters based on the mobile device type.

So, for example, if the audio focusing software is provided as an application, a determination of the mobile device type can be received, and an appropriate audio filter set for a plurality of audio focus regions can be downloaded to the device to be used in conjunction with the application.

Similarly, if the audio focusing functionality is incorporated into other software, the filters can be downloaded from a server to avoid having to place filters for other devices within the software. The filters stored on the mobile device can thus be limited to those applicable to the mobile device.

Example 22

Exemplary Adjustment

In any of the examples herein, further input can be received to indicate that the audio focus region should be adjusted. For example, a set of arrows, or dragging within the scene can be supported. After receiving an indication to adjust the audio focus region in a given direction, an adjustment to the enhancing can be applied based on the given direction.

Example 23

Exemplary Merging

In any of the examples herein, audio from multiple locations can be supported. For example, an indication of a second location within a scene can be received. The second location can be translated into a second audio focus region. Audio received by the microphones can then be further enhanced based on the second audio focus region. For example, the output of multiple audio filter sets can be merged.

Example 24

Exemplary Use Cases

The technologies herein can be applied to a variety of use cases.

For example, the technologies can be used to listen to someone in busy or noisy surroundings. Recordings can focus sound on a given direction while avoiding noise or other audio signals from surrounding areas.

Another implementation uses the technologies in a conference call scenario. The location within the scene can thus correspond to a participant in the conference call, and the method further comprises presenting the enhanced audio during the conference call.

For example, a mobile device can thus be used in a noisy environment to focus audio on the current, speaking participant.

Another implementation uses the technologies for the hearing impaired. Those with hearing loss can hear better in noisy environments by applying the technologies described herein.

Example 25

Exemplary Advantages

As described herein, users can easily take advantage of advanced audio filtering technologies by simply selecting a location on a display.

In implementations employing pre-computed filters, significant computational resources can be saved.

Example 26

Exemplary Computing Systems

Figure 13:
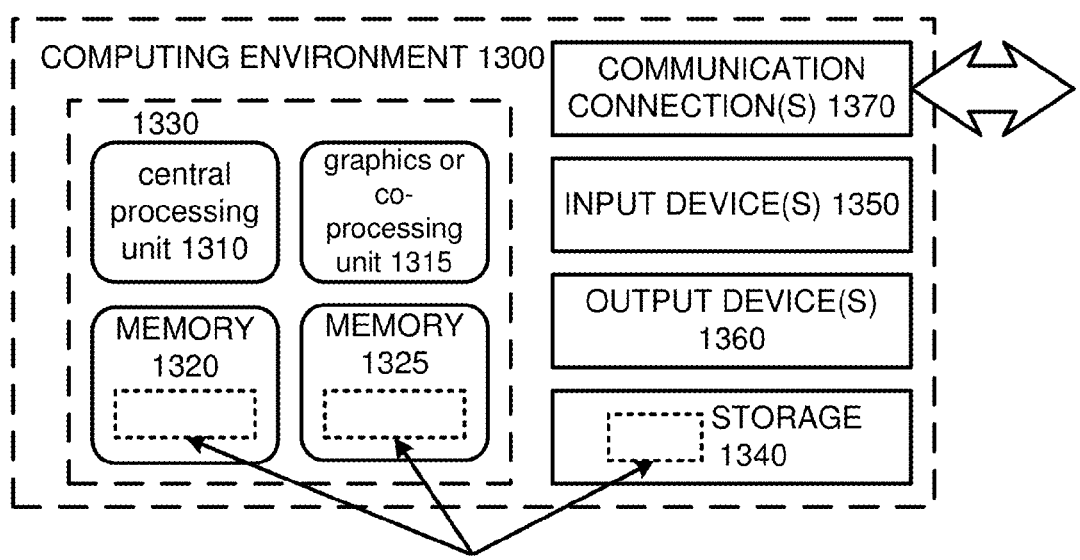
FIG. 13 is a diagram of an exemplary computing system in which some described embodiments can be implemented.

FIG. 13 illustrates a generalized example of a suitable computing system or environment 1300 in which several of the described innovations may be implemented. The computing system 1300 is not intended to suggest any limitation as to scope of use or functionality, as the innovations may be implemented in diverse general-purpose or special-purpose computing systems. A communication device as described herein can take the form of the described computing system 1300.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), nonvolatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s).

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 1300, computer-readable media include memory 1320, 1325, storage 1340, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 27

Exemplary Mobile Device

Figure 14:
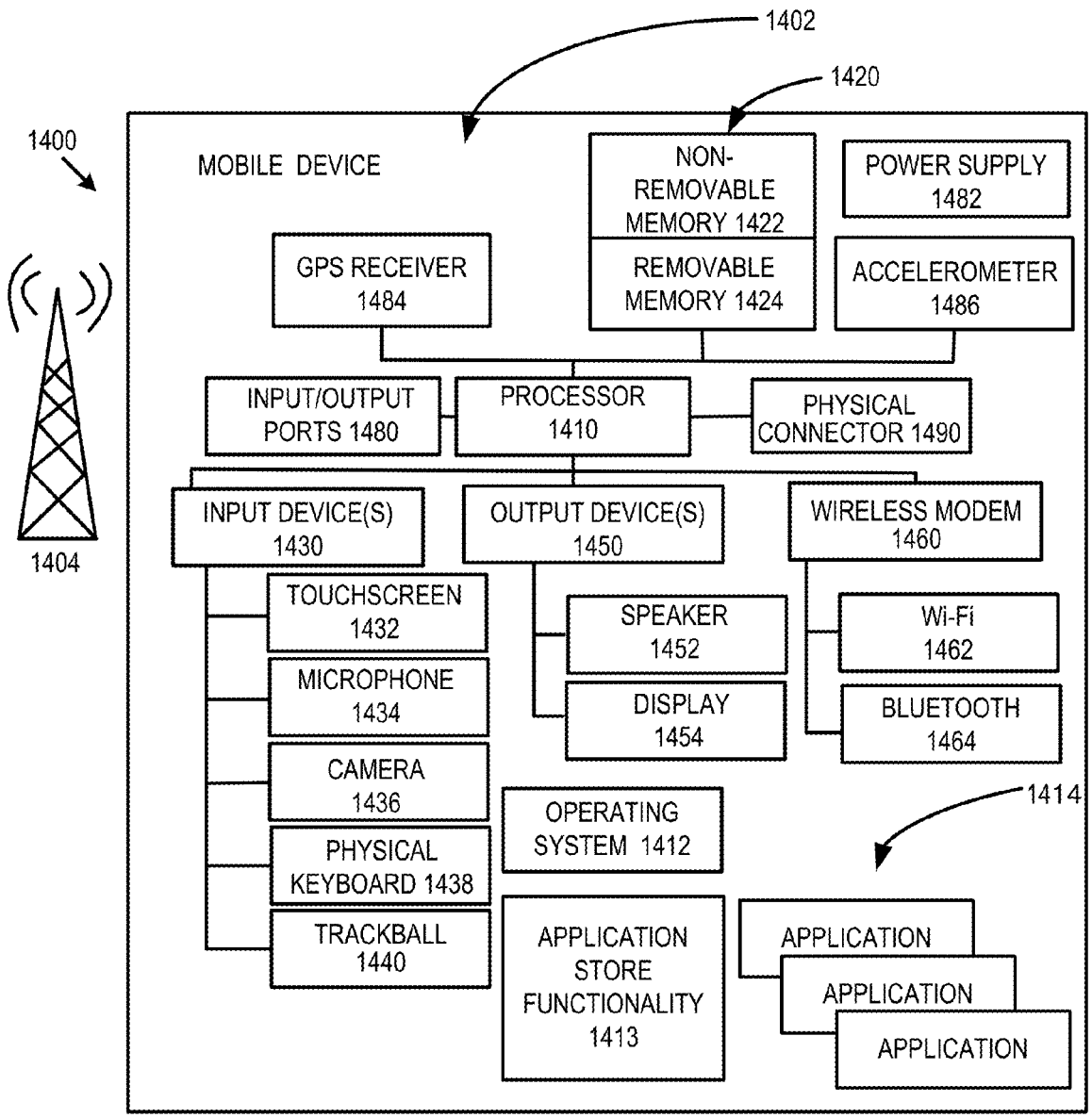
FIG. 14 is an exemplary mobile device that can be used for the technologies described herein.
Figure 15:
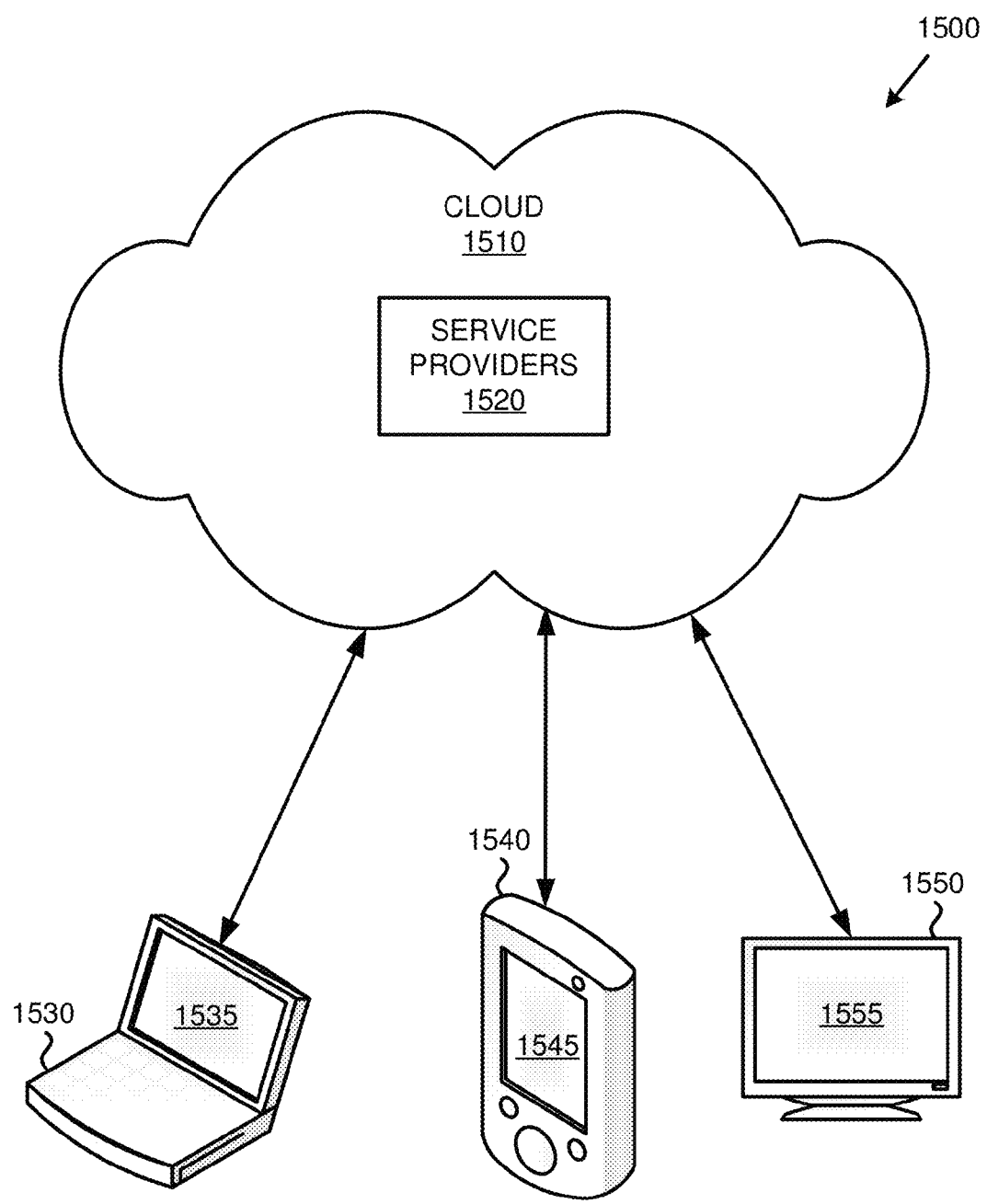
FIG. 15 is an exemplary cloud-support environment that can be used in conjunction with the technologies described herein.

FIG. 14 is a system diagram depicting an exemplary mobile device 1400 including a variety of optional hardware and software components, shown generally at 1402. Any components 1402 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1404, such as a cellular, satellite, or other network. Voice over IP scenarios (e.g., over Wi-Fi or other network) can also be supported. The communication devices described herein can take the form of the described mobile device 1400.

The illustrated mobile device 1400 can include a controller or processor 1410 (e.g., signal processor, microprocessor, ASIC, or other control and processing logic circuitry) for performing such tasks as signal coding, data processing, input/output processing, power control, and/or other functions. An operating system 1412 can control the allocation and usage of the components 1402 and support for one or more application programs 1414. The application programs 1414 can include common mobile computing applications (e.g., email applications, calendars, contact managers, web browsers, messaging applications), or any other computing application. Functionality 1413 for accessing an application store can also be used for acquiring and updating applications 1414.

The illustrated mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as "smart cards." The memory 1420 can be used for storing data and/or code for running the operating system 1412 and the applications 1414. Example data can include web pages, text, images, sound files, video data, or other data sets to be sent to and/or received from one or more network servers or other devices via one or more wired or wireless networks. The memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1400 can support one or more input devices 1430, such as a touch screen 1432, microphone 1434, camera 1436, physical keyboard 1438 and/or trackball 1440 and one or more output devices 1450, such as a speaker 1452 and a display 1454. Other possible output devices (not shown) can include piezoelectric or other haptic output devices. Some devices can serve more than one input/output function. For example, touchscreen 1432 and display 1454 can be combined in a single input/output device.

A wireless modem 1460 can be coupled to an antenna (not shown) and can support two-way communications between the processor 1410 and external devices, as is well understood in the art. The modem 1460 is shown generically and can include a cellular modem for communicating with the mobile communication network 1404 and/or other radiobased modems (e.g., Bluetooth 1464 or Wi-Fi 1462). The wireless modem 1460 is typically configured for communication with one or more cellular networks, such as a GSM or CDMA network for data and voice communications within a single cellular network, between cellular networks, or between the mobile device and a public switched telephone network (PSTN).

The mobile device 1400 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components 1402 are not required or all-inclusive, as any components can be deleted and other components can be added.

Example 28

Exemplary Cloud-Supported Environment

In example environment 1500, the cloud 1510 provides services for connected devices 1530, 1540, 1550 with a variety of screen capabilities. Connected device 1530 represents a device with a computer screen 1535 (e.g., a mid-size screen). For example, connected device 1530 could be a personal computer such as a desktop computer, laptop, notebook, netbook, or the like. Connected device 1540 represents a device with a mobile device screen 1545 (e.g., a small size screen). For example, connected device 1540 could be a mobile phone, smart phone, personal digital assistant, tablet computer, and the like. Connected device 1550 represents a device with a large screen 1555. For example, connected device 1550 could be a television screen (e.g., a smart television) or another device connected to a television (e.g., a set-top box or gaming console) or the like. One or more of the connected devices 1530, 1540, 1550 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1500. For example, the cloud 1510 can provide services for one or more computers (e.g., server computers) without displays.

Services can be provided by the cloud 1510 through service providers 1520, or through other providers of online services (not depicted). For example, cloud services can be customized to the screen size, display capability, and/or touch screen capability of a particular connected device (e.g., connected devices 1530, 1540, 1550).

In example environment 1500, the cloud 1510 provides the technologies and solutions described herein to the various connected devices 1530, 1540, 1550 using, at least in part, the service providers 1520. For example, the service providers 1520 can provide a centralized solution for various cloud-based services. The service providers 1520 can manage service subscriptions for users and/or devices (e.g., for the connected devices 1530, 1540, 1550 and/or their respective users).

Example 29

Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Alternatives

The technologies from any example can be combined with the technologies described in any one or more of the other examples. Where the word "exemplary" is used, it is intended to indicate an example and not necessarily an ideal embodiment. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computing system, the method comprising:
   downloading an audio filter set for a plurality of audio focus regions according to a stored mobile device type indicating a type of a mobile device, wherein the audio filter set comprises a plurality of pluggable audio filters operable to accept input from a plurality of microphones and output enhanced audio as focused within the audio focus regions, wherein the plurality of pluggable audio filters are pre-computed based on combinations of azimuth ranges and elevation ranges based on microphone placement on the mobile device of the stored mobile device type, the plurality of pluggable audio filters being pre-computed, region-specific audio filters;
   displaying a scene currently viewed by a camera;
   receiving an indication of a location within the scene;
   based on the location, determining an azimuth and elevation;
   translating the azimuth and elevation into an audio focus region;
   selecting from the pre-computed, region-specific audio filters based on the audio focus region; and
   enhancing audio received by the plurality of microphones based on the audio focus region, wherein enhancing the audio comprises applying the selected pre-computed, region-specific audio filters to audio received from respective of the plurality of microphones.

2. The method of claim 1 wherein:
   the camera is integrated into a device; and
   the method further comprises:
   tracking movement of the device via one or more positional sensors; and
   adjusting the audio focus region based on the movement.

3. The method of claim 1 further comprising:
   tracking movement of an object appearing within the audio focus region; and
   adjusting the audio focus region based on the movement of the object.

4. The method of claim 3 wherein:
   the object comprises a face; and
   tracking movement of the object comprises applying face detection.

5. The method of claim 1 wherein selecting the pre-computed, region-specific audio filters comprises:
   identifying an entry in a table of pre-computed, region-specific audio filters.

6. The method of claim 1 wherein translating the azimuth and elevation into an audio focus region comprises:
   translating the azimuth and elevation into an audio focus region identifier.

7. The method of claim 1 wherein:
   determining the audio focus region comprises, based on the location, determining an azimuth range identifier and an elevation range identifier combination; and
   selecting the pre-computed, region-specific audio filters comprises mapping the azimuth range identifier and the elevation range identifier combination to the pre-computed, region-specific audio filters.

8. The method of claim 1 wherein:
   enhancing audio received by the plurality of microphones comprises applying audio filters to emphasize sound originating from the audio focus region.

9. The method of claim 1 wherein:
   enhancing audio received by the plurality of microphones comprises applying audio filters to dampen sound originating from the audio focus region.

10. The method of claim 1 wherein:
    receiving an indication of a location within the scene comprises receiving a two-dimensional area.

11. The method of claim 1 wherein:
    the location within the scene corresponds to a location of a participant in a conference call; and
    the method further comprises presenting the enhanced audio during the conference call.

12. The method of claim 1 further comprising:
    receiving an indication of a second location within the scene;

translating the second location into a second audio focus region; and further enhancing audio received by the plurality of microphones based on the second audio focus region.

13. A mobile device comprising:
a stored mobile device type indicating a type of the mobile device;
a camera;
a plurality of microphones;
a display configured to display a scene viewed by the camera;
a downloading tool configured to download an audio filter set for a plurality of audio focus regions according to the stored mobile device type, wherein the audio filter set comprises a plurality of pluggable audio filters operable to accept input from the microphones and output enhanced audio as focused within the audio focus regions, wherein the plurality of pluggable audio filters are pre-computed based on combinations of azimuth ranges and elevation ranges based on microphone placement on the mobile device of the stored mobile device type, the plurality of pluggable audio filters being pre-computed, region-specific audio filters;
an audio focus tool comprising a region translator configured to receive a location on the display and translate the location on the display into an audio focus region; and
an audio filter selector configured to choose from among the plurality of pluggable audio filters based on the audio focus region.

14. The mobile device of claim 13 further comprising:
a table associating audio focus regions with respective sets of audio filters to be applied to audio streams originating from the microphones when a given audio focus region is indicated;
wherein the plurality of pluggable audio filters are represented in the table.

15. The mobile device of claim 13 further comprising:
one or more positional sensors; and
an audio focus region adjustment tool configured to adjust the audio focus region based on detected movement of the mobile device as indicated by the one or more positional sensors.

16. The mobile device of claim 13 further comprising:
an object tracker configured to track movement of an object in an audio focus region; and
an audio focus region adjustment tool configured to adjust the audio focus region according to changes in position detected by the object tracker.

17. One or more nonvolatile memory components having encoded thereon computer-executable instructions causing a computing system to perform a method comprising:
receiving a determination of a mobile device type of a mobile device comprising a plurality of microphones;
based on the mobile device type of the mobile device, with a downloading tool, downloading a pluggable audio filter set for a plurality of audio focus regions to the mobile device, wherein the pluggable audio filter set comprises a plurality of pluggable audio filters operable to accept input from the plurality of microphones and output enhanced audio as focused within the audio focus regions, wherein the plurality of pluggable audio filters are pre-computed based on combinations of azimuth ranges and elevation ranges based on microphone placement on the mobile device of the mobile device type, the plurality of pluggable audio filters being pre-computed, region-specific audio filters;
receiving video output from a camera on a mobile device;
displaying the video output from the camera on the mobile device on a display;
receiving an indication of a location on the display;
translating the location on the display into an audio focus region identifier, based at least on a combination of an azimuth range and an elevation range indicated by the location on the display;
based on the audio focus region identifier, selecting a set of beamformer audio filters out of the pluggable audio filter set configured to enhance audio coming from an audio focus region associated with the audio focus region identifier,
enhancing audio streams originating from respective of the plurality of microphones of the mobile device, wherein the enhancing comprises applying the set of beamformer audio filters to respective of the audio streams; and
outputting the enhanced audio.

* * * * *